United States Patent [19]

Reischl

[11] 4,311,800

[45] Jan. 19, 1982

[54] PROCESS FOR WORKING UP CROSS-LINKED ISOCYANATE DISTILLATION RESIDUES CONTAINING UREA GROUPS AND USE OF THE PRODUCTS OF THE PROCESS AS STARTING COMPONENTS FOR THE PRODUCTION OF SYNTHETIC RESINS

[75] Inventor: Artur Reischl, Leverkusen, Fed. Rep. of Germany

[73] Assignee: Bayer Aktiengesellschaft, Leverkusen, Fed. Rep. of Germany

[21] Appl. No.: 197,447

[22] Filed: Oct. 16, 1980

[30] Foreign Application Priority Data

Oct. 23, 1979 [DE] Fed. Rep. of Germany ....... 2942678

[51] Int. Cl.$^3$ .............................................. C08G 18/14
[52] U.S. Cl. ...................................... 521/109; 260/9; 260/13; 260/453 AR; 260/453 SP; 521/163; 521/164; 521/167; 525/452; 525/540
[58] Field of Search ............... 521/109, 163, 164, 167; 260/453 AR, 453 SP; 525/452, 540; 260/9, 13

[56] References Cited

U.S. PATENT DOCUMENTS

| | | | |
|---|---|---|---|
| 3,128,310 | 4/1964 | Koch | 260/582 |
| 3,331,876 | 7/1967 | vanHorn et al. | 260/582 |
| 3,636,030 | 1/1972 | Perkins | 260/453 SP |
| 3,897,314 | 7/1975 | Liebsch et al. | 203/89 |
| 4,076,577 | 2/1978 | Hetzel et al. | 260/453 SP |
| 4,105,686 | 8/1978 | Raes et al. | 260/453 SP |
| 4,143,008 | 3/1979 | Zwolinski et al. | 260/453 SP |

*Primary Examiner*—Maurice J. Welsh
*Attorney, Agent, or Firm*—Gene Harsh; Joseph C. Gil

[57] ABSTRACT

This invention relates to the preparation of soluble compounds containing hydroxyalkyl and urethane groups by alcoholysis from highly cross-linked insoluble distillation residues (from the commercial production of tolylene diisocyanate) which have reacted completely or almost completely with water. The products obtained as solutions, solvent-free melts or powders may be used as raw materials for the production of synthetic resins or their intermediates which are characterized by reduced combustibility. They may also be recycled by simple hydrolysis into the tolylene diamines ("TDA") from which tolylene diisocyanate ("TDI") is derived.

14 Claims, No Drawings

PROCESS FOR WORKING UP CROSS-LINKED ISOCYANATE DISTILLATION RESIDUES CONTAINING UREA GROUPS AND USE OF THE PRODUCTS OF THE PROCESS AS STARTING COMPONENTS FOR THE PRODUCTION OF SYNTHETIC RESINS

BACKGROUND OF THE INVENTION

This invention relates to the preparation of soluble compounds containing hydroxyalkyl and urethane groups by alcoholysis from highly cross-linked insoluble distillation residues (from the commercial production of tolylene diisocyanate) which have reacted completely or almost completely with water. The products obtained as solutions, solvent-free melts or powders may be used as raw materials for the production of synthetic resins or their intermediates which are characterized by reduced combustibility. They may also be recyclized by simple hydrolysis into the tolylene diamines ("TDA") from which tolylene diisocyanate ("TDI") is derived.

The distillation of the phosgenation product of tolylene diamines results in high molecular weight, insoluble, secondary products containing uretdione, isocyanurate, carbodiimide, uretone imine, urea and biuret groups. Depending on the purity of the amines used as starting materials, the secondary products of the phosgenation also include methyl benzimidazolones which eventually react with the free isocyanate groups present to undergo an increase in molecular size by biuretization into insoluble, cross-linked products.

Partial recycling of these TDI distillation residues which are inevitably formed in enormous quantities in industrial processes has recently been possible by alkaline hydrolysis. However, only a relatively small proportion of tolylene diamines can be recovered by this extremely slow hydrolysis process, and it was only by a very laborous process that these tolylene diamines could be isolated in their pure form (U.S. Pat. Nos. 3,128,310 and 3,331,876).

Greater success in maximizing the yield of 2,4-TDI ("T 100") or of isomeric mixtures of 80% 2,4-TDI and 20% 2,6-TDI ("T 80") or 65% 2,4-TDI and 35% 2,6-TDI ("T 65"), based in each case on the quantity of tolylene diamine put into the process, has been achieved by using so-called "downpipe evaporators" as described in German Offenlegungsschrift No. 2,035,731. In these apparatus, reduced quantities of a sump phase which is almost free from monomers but still contains up to 25% by weight of free isocyanate groups is obtained. In order to prevent smoldering combustion which is liable to occur, as well as for physiological reasons, this phase is chilled with water to form a tar-like mass at about 150° to 300° C. immediately after removal of the pure monomeric TDI. In this denaturing process, the free isocyanate groups still present react to a large extent with water. The reaction is accompanied by vigorous evolution of carbon dioxide and the formation of additional urea and biuret groups so that only a small reside, in most cases about 1 to 10% by weight, of free isocyanate groups trapped by inclusion remains. In the text which follows, these cross-linked products which have been treated with water and are substantially free from monomers will be referred to as "denatured" TDI distillation residues. When the substance is stored in water or in a moist state, the isocyanate content gradually diminishes over a relatively long period.

The resulting denatured TDI residues which are obtained in the form of slags and contain polyureas, biuret, uretdione, carbodiimide and isocyanurate groups are completely insoluble in all the usual solvents. This is in contrast to the low molecular weight sump phase of distillation which still has a high isocyanate content before denaturation with water but is not stable in storage. Above 250°±30° C., these denatured TDI residues begin partially to melt, and decomposition occurs with evolution of gas. No technically or economically feasible solution has hitherto been found in the art for utilizing these residue slags, particularly the infusible TDI 80 residue slags which constitute by far the greatest proportion of slags obtained from TDI production and which have a very high molecular weight and are highly temperature resistant.

It was therefore an object of the present invention to produce conversion products from TDI residue slags which have been denatured with water to render them environmentally harmless, which conversion products would be utilizable in a homogeneous, liquid, form as raw materials for the production of synthetic resins with improved properties.

It has now surprisingly been found that liquid and soluble conversion products are obtained when completely insoluble highly cross-linked, slag-like, size-reduced tolylene diisocyanate distillation residues which have been denatured with water are reacted at elevated temperatures with low molecular weight compounds containing hydroxyl groups.

The low molecular weight and relatively high molecular weight secondary products obtained according to the invention which contain H-acidic groups may be used at any stage, even without a purification process and optionally through further intermediate stages, for the production of high quality synthetic resins with reduced combustibility. In special cases, they may simply be recycled to form the diamines originally put into the process.

DESCRIPTION OF THE INVENTION

This invention therefore relates to a process for working up substantially monomer-free cross-linked distillation residues which are insoluble in inert organic solvents and which cannot melt without decomposition, which residues are obtained in the form of slags by denaturing of the sump phase with water when monomeric tolylene diisocyanates are removed by distillation from the crude phosgenation product of tolylene diamines, comprising reacting residue slags, which preferably have a particle size of less than 3 mm, in particular less than 1 mm, most preferably less than 0.2 mm, at a temperature above 130° C., up to 300° C., preferably at 140° to 220° C., most preferably at 150° to 210° C. with a dihydric and/or trihydric and optionally also a monohydric alcohol, with a molecular weight of 62 to 600, preferably 62 to 200, using a quantity of alcohol such that at least 2% by weight, preferably at least 8% by weight, most preferably at least 15% by weight of alcoholic hydroxyl groups are present, based on the mixture of residue slags and alcohol, continuing the reaction until the reaction mixture is homogeneous, and then stopping the reaction by cooling, and subsequently removing unreacted, excess alcohol, if any, e.g., by distillation at reduced pressure and at temperatures below 130° C. or by washing with water.

The TDI residue slags, which are suspended in water in the denaturing process and which are generally obtained as very coarse granules, are suitable first broken down into particles smaller than 3 mm, preferably smaller than 1 mm. They may be either wet or in a predried state. They may be broken down in size reducing machines such as, a cutting edge granulator or a hammer mill, and subsequently reduced by grinding processes, either in the wet or dry phase, to a suitable size for reaction with the compounds containing alcohol groups. It should be borne in mind that, as will be explained later, the conversion according to the invention of the TDI residue slags, which are highly cross-linked through their main valency bonds, into useful and reproducible secondary products is influenced both by the particle size of the residue slags and by the nature and quantity of the alcoholic compounds required as well as by the reaction temperature, the reaction time and the vigorousness of mixing.

The most suitable compounds containing alcoholic hydroxyl groups are glycols having an average molecular weight below 600, in particular below 200, for example: ethylene, diethylene, triethylene and tetraethylene glycol; the homologous propylene glycols; and the sump residues left after commercial production of ethylene and propylene glycol from the corresponding alkylene oxides, which have hitherto mostly been burned in heating power stations. Butanediol, butenediol and hexane diol are also suitable. Low molecular weight trihydric alcohols, particularly glycerol, are suitable, although preferably only in admixture with glycols. A certain proportion of molohydric alcohols may be included in special cases, especially those with a boiling point above 150° C., particularly when trihydric alcohols are also used. The addition of monohydric alcohols is especially recommended if they also have a dispersing action when the products of the process are subsequently mixed with relatively high molecular weight H-acidic compounds. Glycols which have ester, acetal, polyamide or polyurea groups in addition to their alcoholic function are less suitable. Glycols of this type make only a very small contribution to the linearization reactions and are therefore mainly used as mixtures with other glycols. Most suitable for the process according to the invention are ethylene, diethylene, 1,2-propylene and dipropylene glycol; 1,4-butanediol; and the above-mentioned distillation residues from the production of ethylene glycol and propylene glycol, or mixtures of these glycols.

The reactions of the process according to the invention always start with the size-reduced, highly cross-linked TDI residue in the solid state which, without the reaction according to the invention with compounds containing alcohol groups, cannot be molded into homogeneous products even under extreme conditions, such as at temperatures above 200° C. and above 100 bar pressure, because of their lack of thermoplasticity. When attempts are made to mold such substances, the products have the consistency of tablets which can easily be rubbed to a powder between the fingers. When at least an equal quantity by weight of liquid hydroxyl compounds is added to the pulverized residue slags, a suspension which can be mixed thoroughly is first obtained. This suspension dissolves fairly rapidly at the preferred temperature of 150° to 210° C., depending on the particle size. Slags reduced to a particle size below 0.2 mm dissolve in ethylene glycol after a reaction time of about 30 to 60 minutes at 150° C. and after only about 1 minute at 210° C. When 70 (55;50)% by weight of ethylene glycol is used, based on the total mixture including the TDI residue, deep reddish brown, homogeneous liquids are obtained. These liquids have viscosities of 450 (21,000;105,000) mPas at 25° C. They can even be diluted with water in quantities of up to 50% by weight, based on the glycollic reaction solution. They can also be diluted with many of the usual solvents, particularly if traces of water are included. Examples of such solvents include methanol, ethanol, acetone and tetrahydrofuran. The compounds containing hydroxyalkyl and urethane groups which are obtainable by the linearization reaction according to the invention can be prepared reproducibly and substantially without decomposition reactions accompanied by evolution of carbon dioxide if the reaction parameters discussed above (including time and temperature) are carefully adjusted relative to each other. The optimum conditions should preferably first be determined in preliminary tests. The action of the alcohols which produce the linearization reactions should be restricted to as short a time as possible and the reaction temperature should not be higher than is necessary for rapid conversion of the cross-linked slag into soluble linearization products (reaction times of 1 to 60 minutes are preferred). As already mentioned above, the linearization reaction may be stopped when the reaction mixture has become homogeneous, i.e., as soon as the reaction products have gone into solution in excess alcohol. Further heating may cause the above-mentioned decomposition reactions, with evolution of carbon dioxide, to take place. The optimum reaction temperature within the ranges indicated above can easily be ascertained for each alcohol by a simple preliminary test. In order to ensure rapid alcoholysis, it is preferred to use very finely divided TDI residue slags and relatively large excesses of alcohols preferably with a relatively high hydroxyl group content, i.e., with a low molecular weight. Also, very vigorous mixing should be carried out.

It is surprisingly possible when using denatured TDI reside slag (with an average particle size below 300 μm, preferably below 100 μm, and at least the same quantity by weight of low molecular weight glycols such as thyelene or diethylene glycol, based on the dry weight of the residue slags, otpionally with the inclusion of small quantities of alkali) to start the linearization reactions batchwise in a simple stirrer apparatus by gradually heating a suspension of the TDI residue in the glycol to 100°-120° C. and then to complete the reaction within the 15 minutes by rapidly heating the reaction mixture to temperatures of about 150°-180° C. Secondary products containing urethane and hydroxyalkyl end groups are obtained as solutions in the excess glycol. These secondary products are stable in storage and may be used directly as chain lengthening agents or cross-linking agents for the production of cellular or non-cellular polyurethane resins or polyurethane coatings. It is also possible, for example, subsequently to add saturated or unsaturated dicarboxylic acids to the products of glycolysis in the same apparatus so that they react with elimination of water to form hydroxyl functional polyesters with chemically fixed polyurethane and possibly also polyurea groups. These polyesters may be used as intermediate products for the production of polyurethane resins.

Cylindrical reactors with positive transport of the reaction mixture are particularly suitable for the continuous method of carrying out the process according to the invention. This is particularly true if only small excess quantities of low molecular weight glycols, relatively high molecular weight hydroxyl compounds or less finely ground denatured TDI residues are to be used. It is particularly advantageous to use self-cleaning reactor screws such as those described, for example, in "Schneckenmaschinen in der Verfahrenstechnik" by H. Hermann, Springer-Verlag, Berlin/Heidelberg/New York, 1972, pages 161–170. It is especially suitable to use multishaft, in particular two-shaft screws containing pairs of intermeshing screws rotating in the same direction and scraping each other (except for a slight clearance). These screws may be equipped with a distillation device for removal of the residual moisture and possible excess glycol. Screws of this type have been described, for example, in German Offenlegungsschriften Nos. 2,925,944; 2,302,564 and 2,423,764 (U.S. Pat. No. 3,963,679) and in the literature cited there; in German Pat. Nos. 813,154; 862,668 and 940,109 and U.S. Pat. Nos. 3,233,025 and 3,642,964.

One advantage of these screws is their constant self-cleaning and positive transport of their contents within a narrow range of residence times. Moreover, this system of screws produces intensive forced convection which not only has an intensive mixing effect but also provides excellent conditions for heat transfer at the internal wall of the housing, a circumstance which is of great significance for temperature control (which is important in the process according to the invention).

The products obtained from the process may be either liquid or solid at room temperature, depending on the quantity of alcohol used in the process according to the invention. When a solid end product is obtained, the above-mentioned screws have an unexpectedly powerful size reduction effect, which has the advantageous result that the reaction products are ejected in the form of a pulverulent to granular, easily pourable material. The screws are therefore found to be not only suitable reactors for the formation of hydroxyalkylurethanes from the TDI residue slags (with accurately adjustable, clearly defined and reproducible reaction conditions combined with very short reaction times and virtually quantitative and very careful degradation of the cross-linking points) but also a very operationally reliable apparatus for size reduction of the product, which can be achieved within the same working process.

If a relatively large excess of glycols having a boiling point below 250° C. is used in the process according to the invention, the unreacted glycol may, if desired, be partially or completely removed by vacuum distillation, preferably in a multishaft evaporation screw. Linearization products which contain hydroxyalkyl and urethane groups and are substantially free from alcohols remain behind and can in many cases be discharged as highly viscous melts at 150° to 180° C. The melts dissolve in dimethyl formamide and, as gel chromatographic investigations with comparison substances have shown, they contain a considerable proportion of compounds of the type formed by the polyaddition of monomeric tolylene diisocyanates with a large excess of glycols. Relatively high molecular weight urea compounds and carbodiimide compounds can also be detected, although in a greatly reduced quantity, as well as small quantities of aromatic diamines or monoamines which are identical with the amines used for phosgenation, or derivatives of these amines.

Products of the process substantially freed from excess alcohols can be reduced to very finely divided powders melting at about 150° to 180° C. They may be used, for example, in a dissolved or suspended form as isocyanatereactive chain-lenghtening agents for the production of polyurethanes.

If reaction screws are used for the process according to the invention, it may be carried out with considerably smaller excess quantities of compounds containing alcohol groups and with much larger particles of denatured TDI residue slags. This is because, by virtue of the forced transport, the material in the screw can pass continuously and quite problem-free through various pulverulent or pasty or even liquid states without sticking or forming lumps. Particularly suitable mixing elements for screws, which effect additional size reduction of the initially granular TDI residue and more intensive mixing with the hydroxyl compounds under conditions of forced transport have been described in German Pat. Nos. 813,154 and 940,109.

When so-called evaporator screws are used, it is particularly advantageous to mix the hydroxyl compounds intimately with the TDI residue slags still moist from the denaturing process and at the same time heat them in the screw. It has been found that the hydrophilic hydroxyl compounds penetrate particularly efficiently, especially at elevated temperatures, into the TDI residue slags still wet with water. This is because these slags are permeated with pores as a result of the evolution of carbon dioxide which occurs during the process of denaturing with water. The residual moisture, which may be up to 25% by weight, based on the quantity of slag put in the process, is rapidly removed via a distillation attachment by increasing the screw temperature to about 130°–160° C. and the alcoholysis reaction is at the same time started, with gradual liquefaction of the reaction mixture. In order to achieve substantially quantitative but careful degradation of the cross-linkage points by the linearization reactions according to the invention, the temperature of the product is increased at approximately the middle of the screw to about 200°–210° C. and lowered by cooling at the end of the screw, at least down to 170° C., preferably to below 120° C. The linearization products may be isolated as solutions, melts or solid pulverulent products, according to the nature and quantity of the compounds with alcoholic groups put into the process, the dwell time (which is preferably about 3 to 15 minutes), and the temperature profile.

If the reaction screw is long enough or if two screws are joined together one behind the other, the linearization reaction may be followed by other reactions integrated into the process. In particular, polyisocyanate polyaddition reactions, optionally with the additional use of other isocyanate reactive low molecular weight and/or higher molecular weight H-acidic compounds, may be integrated into the process. Polyurethanes can thereby be directly obtained. These secondary reactions may also be carried out at any other time and in any other place after isolation of the products obtained according to the invention, because of the excellent stability in storage of these products. The production of homogeneous or cellular polyurethanes is carried out using the linearized TDI residues modified with hydroxyalkyl and urethane groups as novel raw materials functioning as chain-lengthening agents.

The present invention therefore relates to a process for the preparation of cellular or non-cellular flame-resistant polyurethanes by the reaction of
(A) polyisocyanates with
(B) compounds containing isocyanate reactive groups, optionally in the presence of
(C) activators, blowing agents, fillers and other known additives,
which process is characterized in that the substance used as component (B) comprises, at least in part, the denatured TDI residues worked up according to the invention and/or of their esterification and/or alkoxylation products.

Polyisocyanates suitable for the preparation of the polyurethane plastics, as well as additives and any other additional compounds containing isocyanate reactive groups, in particular high molecular weight and low molecular weight polyols and polyamines, can be found in the literature, as can also suitable methods for their preparation, e.g., in German Offenlegungsschriften Nos. 2,302,564; 2,423,764 (U.S. Pat. Nos. 3,963,679); 2,550,796; 2,550,797 and 2,550,833 (U.S. Pat. Nos. 4,093,560 and 4,147,680).

As already mentioned above, the hydroxyalkyl groups of the linearization products according to the invention may also be converted into corresponding relatively high molecular weight intermediate products. For example, they may be converted into saturated or unsaturated polyesters containing polyurethane groups by esterification with dicarboxylic acids. They may be converted into polyesters by alkoxylation reactions. They may also be converted into isocyanate prepolymers by reaction with an excess of polyisocyanate. Synthetic resins can again be obtained from all these intermediate products by known polyaddition, polycondensation and polymerization processes.

Any reactions in which the linearization products obtained according to the invention can take part through their reactive groups, i.e., in particular their hydroxyl and urethane groups as well as their olefinically unsaturated groups (in cases where, for example, unsaturated alcohols are used for the process of working up or the products of working up have been reacted with unsaturated carboxylic acids), may be carried out in this connection in addition to the polyisocyanate polyaddition reactions already mentioned above. Examples include, inter alia, polycondensation reactions of carbonyl compounds with aminoplast and/or phenoplast monomers, epoxide resins or cyanate resins and copolymerization reactions with vinyl monomers.

The homogeneous or cellular plastics obtained in this way, in particular polyurethane foams, coatings, lacquers, films, adhesives, grouting compositions and cements, are distinguished by their improved physical properties, in particular their increased tensile strength and reduced flammability. In polyurethane formulations in which very large quantities of isocyanates are used, which frequently leads to extremely high reaction temperatures which are difficult to control and have a deleterious effect on the properties of the polyurethane plastics, smaller quantities of isocyanates may be used if products according to the invention are included, so that the polyaddition reaction will take place at lower and therefore less damaging reaction temperatures. The properties of the synthetic resins prepared according to the invention may in addition be varied by the use of organic and/or inorganic fillers.

Materials containing lignocellulose, in particular wood shavings and wood waste, such as those mentioned, e.g., in German Offenlegungsschrift No. 2,325,926 (U.S. Pat. No. 3,870,665), are of particular interest in this connection. For example, the denatured TDI residue slags which have been linearized according to the invention may be used in quantities of up to about 60% by weight, preferably 5 to 40% by weight, based on the total weight of the finished article, in the production of plates or molded articles by compression molding of lignocellulose-containing fibers, shavings or layers mixed with a suitable binder (e.g., polyisocyanate and/or condensation products of formaldehyde and urea, melamine and/or phenol). Methods of producing such materials have been described in the above-mentioned U.S. Pat. No. 3,870,665 and in German Offenlegungsschrift No. 1,669,759 and German Auslegeschrift No. 1,653,169 and the literature cited therein.

The examples which follow illustrate the process according to the invention. Quantities given are to be understood as parts by weight or percentages by weight unless otherwise indicated.

The tolylene diisocyanate (TDI) residue slags used in the Examples were obtained as virtually monomer-free sump phase in the vacuum distillation of monomeric 2,4-/2,6-TDI (isomeric mixture 80:20) from the phosgenation product of TDA. They were immediately denatured with a large excess of water as a hot, tarry mass (TDI tar) at a temperature of 150°–180° C. containing 23 to 28% by weight of free isocyanate groups, with vigorous evolution of carbon dioxide and formation of polyurea and biuret groups. Furthermore, the moist residue slags were free from or contained only 1–10% by weight of included free isocyanate groups and contained substantial quantities of uretdione, isocyanurate, carbodiimide and uretone imine groups and small quantities of methyl benzimidazolones and their biuretization derivatives. These highly cross-linked TDI residue slags contained no monomeric tolylene diisocyanates and were insoluble in all the usual organic solvents such as methylene chloride, cyclohexane, cyclohexanone, toluene, xylene or dichlorobenzene, even at a boiling temperature and when very finely crushed. They only swelled in boiling dimethylformamide. At temperatures above 280° C., gradual decomposition took place without melting. The coarsely granular TDI residue slags were first roughly size reduced to below 1–3 mm in a hammer mill while having a residual moisture content below 15% by weight, and ground down to an average particle size below 200 μm in an airflow mill. In the alternative, they were ground down to below 20 μm in an airflow mill after substantial removal of the residual moisture. The finely divided denatured residue slags had a markedly duromeric character, i.e., they could not be homogeneously molded even with the application of pressure at a temperature of 250° C. In fact, the products obtained from such a process could easily be crushed between the fingers.

EXAMPLE 1

60 parts of a denatured TDI residue obtained as described above (residual moisture content below 2%, particle size below 200 μm; free isocyanate group content 8.6%) were stirred into 100 parts of monoethylene glycol in a stirrer apparatus, initially at room temperature, and the temperature was then raised to 100° C. A further 40 parts of the same TDI residue were then stirred into the resulting hot suspension. The temperature of the reaction mixture was then rapidly raised to 170° C. under a weak stream of nitrogen.

The dispersed, finely divided residue slag changed within 10 minutes into a reddish brown, highly concentrated glycollic solution, which was immediately cooled. At 25° C., the resulting solution of linearized TDI residue, which is stable in storage, had a viscosity of 105,000 mPas. As shown by gas chromatographic investigation, the solution still contained 45.5 parts of the glycol originally used, i.e., 54.5 parts of glycol were used up for the linearization reaction of 100 parts of the denatured distillation residue. The viscosity was reduced to 21,000 (450) mPas by dilution of the about 77% solution with 11(40) parts of ethylene glycol.

The IR spectrum showed substantial quantities of urethane groups in addition to the glycol component, and minor quantities of carbodiimide and urea groups but no biuret or isocyanurate groups. Low molecular weight and relatively high molecular weight polyhydroxyethylurethanes derived from tolylene diisocyanates as well as minor quantities of aromatic amines corresponding to the tolylene diamines used for phosgenation could be identified by gel chromatography analysis (as could be demonstrated by comparison chromatograms).

The 77% glycollic solution obtained in the process according to the invention could be diluted with up to 40% of water at room temperature without precipitation and was soluble in methanol, tetrahydrofuran and dimethylformamide.

EXAMPLE 2

The free monoethylene glycol present in the 77% solution of the linearization product obtained according to Example 1 was removed by distillation at reduced pressure and at a temperature of 100° to 130° C. A residue which melted quantitatively at 150° to 170° C. was left behind. After cooling, this was reduced to a very fine powder. The powder may be used directly or in the form of a dispersion for the production of synthetic resins, in particular by the polyisocyanate polyaddition process.

EXAMPLE 3

10 parts of water and 50 parts of acetone were stirred into 100 parts of the 77% solution of the linearization product prepared according to Example 1. The linearization product was precipitated from this solution by stirring the solution into 500 parts of water. A finely divided precipitate was obtained, which was filtered off, washed with water and dried. The resulting powder had a melting point of 160° to 170° C. and was analytically substantially identical to the residue obtained according to Example 2.

EXAMPLE 4

100 parts of the 77% solution linearized TDI residue in ethylene glycol obtained according to Example 1 were esterified with 40 parts of adipic acid with elimination of water in a weak stream of carbon dioxide at 180° to 195° C. in a stirrer apparatus. A polyester containing urethane groups and having a softening point of about 50° C. was obtained. This may be used directly as raw material for the production of polyurethanes.

EXAMPLE 5

100 parts of the pulverulent product obtained according to Example 2 were mixed with 15 parts of a commercial crude diphenylmethane diisocyanate (isocyanate content 30%) at room temperature and molded into plates 2 and 4 mm in thickness at 170° to 180° C./50 bar. These plates may be used as wall panelling or floor covering and have substantially better fire resistance than conventional polyurethane plates. The ball pressure hardness after 30 seconds was 205 mPa and the modulus of elasticity was 3430 mPa.

EXAMPLE 6

100 parts of momoethylene glycol and 133 parts of a denatured TDI distillation residue having a particle size below 1.2 mm, a water content of 25% and an isocyanate content of 1.2% were heated as described in Example 1 to 100° to 120° C. in a stirrer apparatus with a distillation bridge to remove the water by distillation. A weak stream of nitrogen was then passed through the suspension and the temperature was rapidly raised to 160° C., and after 20 minutes to 180° C. When the TDI residue had dissolved, the suspension was cooled to 120° C. and the solution was filtered through a 100 μm sieve.

When cold, the solution had a viscosity of 102,000 mPas at 25° C. and was virtually identical in its chemical composition to the product obtained in Example 1.

EXAMPLE 7

500 parts of the solution obtained according to Example 1 of the linearized TDI distillation residue in excess ethylene glycol, 100 parts of phenol, 106 parts of a 30% aqueous formaldehyde solution and 12 parts of 85% aqueous polyphosphoric acid were heated in a stirrer apparatus and the water was completely distilled off. The temperature of the reaction mixture was raised to 140° C. towards the end of the condensation reaction. On cooling to 40° C., the product changed into a very viscous mass which may be used as adhesive or binder, optionally with the addition of compounds containing isocyanate groups. This mass is also suitable as hydroxyl-containing starting component for the production of homogeneous or cellular polyurethanes.

EXAMPLE 8

Manufacture of a wood chipboard.

Chips of needlewood (length 0.5 to 2.5 cm; water content 8 to 10%) were intensively mixed mechanically with the polycondensates of Example 7 heated to 80° to 100° C. (mixing proportions 90:10). The mixture, which is stable in storage, was strewn over steel plates and molded under pressure at 80° C. (15 second per millimeter of thickness of board).

A 10 mm thick chipboard with a gross density of 0.8 g/cm³ produced in this way is extremely resistant to breakage by impact and has great hardness and surface gloss. It can be worked mechanically much better than conventional chipboard and can be lacquered more easily.

Chipboards which have extreme resistance to moisture, and even to storage in water, were obtained when 5% by weight, based on the whole quantity of material, of crude diphenylmethane diisocyanate (isocyanate content 30%) was used as additional binder.

EXAMPLE 9

100 parts of diethylene glycol and 100 parts of the denatured TDI residue used in example 1 were reacted as described in Example 1. A reddish brown solution of the linearized residue in excess diethylene glycol having a viscosity of 1800 (10,500) mPas at 70 (40)° C. was obtained.

76 parts by weight of diethylene glycol was isolated by gas chromatography from the resulting solution, which meant that 24% of the diethylene glycol had been used up in the linearization reaction according to the invention. If the excess diethylene glycol is carefully distilled off under reduced pressure, a residue which contains hydroxyalkyl and urethane groups and which can be reduced to a fine powder is obtained. This residue, like the liquid product dissolved in diethylene glycol, may be used as chain-lengthening agent for the production of polyurethanes.

EXAMPLE 10

Production of a rigid polyurethane foam.

127 parts of a liquid commercial diphenylmethane diisocyanate (isocyanate content 30.4%) were stirred into a freshly prepared mixture of 100 parts of a polyether with hydroxyl number 380 and water content 1.8% by weight obtained by the propoxylation of saccharose, 50 parts of the solution of linearized TDI distillation residue in ethylene glycol obtained according to Example 6, 1.3 parts of N,N-dimethylcyclohexylamine and 35 parts of monofluorotrichloromethane within 12 seconds at room temperature, and the reaction mixture was poured into the open mold. The foam set after 97 seconds. Its unit weight was 27.8 kg/cm³. The rigid foam obtained was distinguished by exceptional toughness.

EXAMPLE 11

85 parts of flexible polyurethane foam waste reduced to particles below 3 mm, 10 parts of the solution of linearization product obtained according to Example 9 and 5 parts of crude diphenylmethane diisocyanate (isocyanate content 30.4%)
were vigorously mixed mechanically at 100° C. More than 70% of the free isocyanate groups of the diphenylmethane diisocyanate reacted with the solution of linearized TDI distillation residue. The pourable mixture obtained was compression molded at 160° to 180° C. and 30 to 50 bar, to form a cellular polyurethane. When compared with a comparison product obtained from 85 parts of flexible foam waste and 5 parts of crude diphenylmethane diisocyanate (without the use of the linearization products prepared according to the invention), the resulting homogeneous, rubbery elastic molded plates had a tensile strength which was higher by 55% and an elongation on tearing which was increased to 2-½ times the value of the other product.

EXAMPLE 12

100 parts of the solution of the linearization product in diethylene glycol obtained according to Example 9 were esterified with 40 parts of adipic acid as described in Example 4. The polyester had a viscosity of 1800 (10,500) mPas at 70(40)° C.

EXAMPLE 13

120 parts of 1,4-butanediol and 80 parts of the denatured TDI residue from Example 1 were reacted as described in Examples 1 and 6. A reddish brown solution in excess butanediol of a linearization product containing hydroxybutyl urethane groups was obtained. The solution had a viscosity at 100(50)° C. of 1200 (10,600) mPas.

EXAMPLE 14

60 parts of denatured TDI-residue (as used in example 1) (residual moisture content below 2%, particle size however below 20 mμ, free isocyanate content 8.6%) were stirred into 100 parts of a distillation residue from the preparation of ethyleneglycol (hydroxyl number 514; main constituents: tetra-penta- and hexaethylene glycol, pH 9–11 because of low alkalihydroxide content from preparation) initially at room temperature, and the temperature was then raised to 100° C. A further 40 parts of the same TDI-residue were then stirred into the resulting hot suspension. The temperature of the reaction mixture was then rapidly raised to 170° C. under a weak stream of nitrogen. The dispersed, finely divided residue slag changed within 10 minutes into a reddish-brown, highly concentrated (50%) solution, which has a viscosity at 100 (35,50)° C. of 800 (2100,8900) mPas.

When the experiment was repeated with coarser particles of TDI residue slag from Example 6 (particle size ≦1.2 mm), about 25 to 40% of the residue put into the process remained undissolved even after 2 hours' heating of the reaction mixture to 180°–210° C.

If the linearization reaction is not carried out batchwise in a stirrer vessel but continuously in an evaporation screw, the coarser residue slag (which still has a water content of 25%) can also be linearized without problems with the ethylene glycol distillation residue defined above, using high temperatures, preferably 220° to 270° C. in the evaporation screw.

EXAMPLE 15

100 parts of glycerol and 100 parts of a denatured TDI residue slag having a particle size below 100 μm (isocyanate content 0; residual moisture content 3.5%) were reacted at 180° to 200° C. by a method analogous to that of Example 1. A reddish brown solution having a viscosity at 70(60)° C. of 10,000 (60,000) mPas was obtained.

EXAMPLE 16

100 parts by weight of the modified 50% by weight solution of TDI residue in ethyleneglycol according Example 1 are hydrolized with 30 parts by weight of a 33% by weight aqueous solution of sodium hydroxide in an autoclave for 45 minutes at 170° to 210° C.

The cooled red brown reaction solution is extracted with methylene chloride as to separate the isomeric 2,4'- and 2,6'-toluylene diamines. After drying of the organic phase the diamines are isolated by distillation at 168°–180° C. and 25 mbars in pure form so that the diamines may be reused for phosgenation and production of the corresponding diisocyanates.

What is claimed is:

1. A process for the production of isocyanate-reactive compounds, comprising:
   (A) reacting
      (i) substantially monomer-free, cross-linked distillation residues which are insoluble in inert organic solvents and which cannot melt without decomposition, obtained in the form of slag after denaturation of the sump phase with water when monomeric tolylene diisocyanates are removed by distillation from the crude phosgenation product of tolylene diamines; with (ii) a dihydric and/or trihydric alcohol at a temperature above 130° C., using a quantity of alcohol corresponding to at least 2% by weight of alcoholic hydroxyl groups, based on the mixture of slag and alcohol, (B) continuing the reaction until the reaction mixture is homogeneous; and (C) stopping the reaction by cooling.

2. The process of claim 1, wherein any unreacted excess alcohol is removed after termination of the reaction.

3. The process of claim 1, wherein said residue slag has a particle size of less than 3 mm.

4. The process of claim 3, wherein said residue slag has a particle size of less than 1 mm.

5. The process of claim 3, wherein said residue slag has a particle size of less than 0.2 mm.

6. The process of claim 1, wherein said dihydric and/or trihydric alcohol has a molecular weight of 62 to 200.

7. The process of claim 1, wherein said alcohol is a mono-, di- or polyethylene glycol.

8. The process of claim 1, wherein the quantity of alcohol used is such that the reaction mixture contains at least 8% by weight of alcoholic hydroxyl groups, based on the mixture of residue slag and alcohol.

9. The process of claim 1, wherein the reaction temperature is 140° to 220° C.

10. The process of claim 1, further comprising hydrolyzing the resulting linearized products to tolylene diamine.

11. The process of claim 1, further comprising the addition of monohydric alcohol having a molecular weight of 62 to 600 in the reaction.

12. A process for the preparation of synthetic resins by polyaddition, polycondensation or polymerization processes, characterized in that the isocyanate-reactive component is prepared by a process comprising:

(A) reacting
  (i) substantially monomer-free, cross-linked distillation residues which are insoluble in inert organic solvents and which cannot melt without decomposition, obtained in the form of slag after denaturation of the sump phase with water when monomeric tolylene diisocyanates are removed by distillation from the crude phosgenation product of tolylene diamines; with
  (ii) a dihydric and/or trihydric alcohol at a temperature above 130° C., using a quantity of alcohol corresponding to at least 2% by weight of alcoholic hydroxyl groups, based on the mixture of slag and alcohol, (B) continuing the reaction until the reaction mixture is homogeneous; and (C) stopping the reaction by cooling.

13. The process of claim 12, further comprising the addition of materials containing lignocellulose as fillers.

14. A process for the preparation of cellular or non-cellular flame-resistant polyurethanes, comprising reacting:

(A) polyisocyanates with (B) compounds containing isocyanate reactive groups, optionally in the presence of (C) activators, blowing agents, fillers and other known additives, wherein component (B) comprises at least in part, the distillation residues worked up according to claim 1 and/or their esterification and/or alkoxylation products, optionally in admixture with materials containing lignocellulose.

* * * * *